Figure 1:
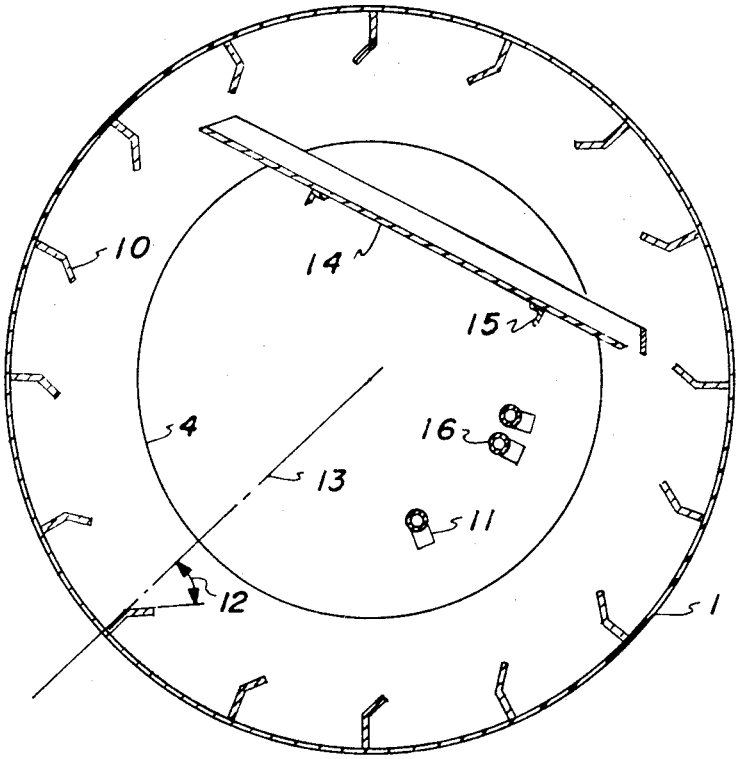
Figure 2:
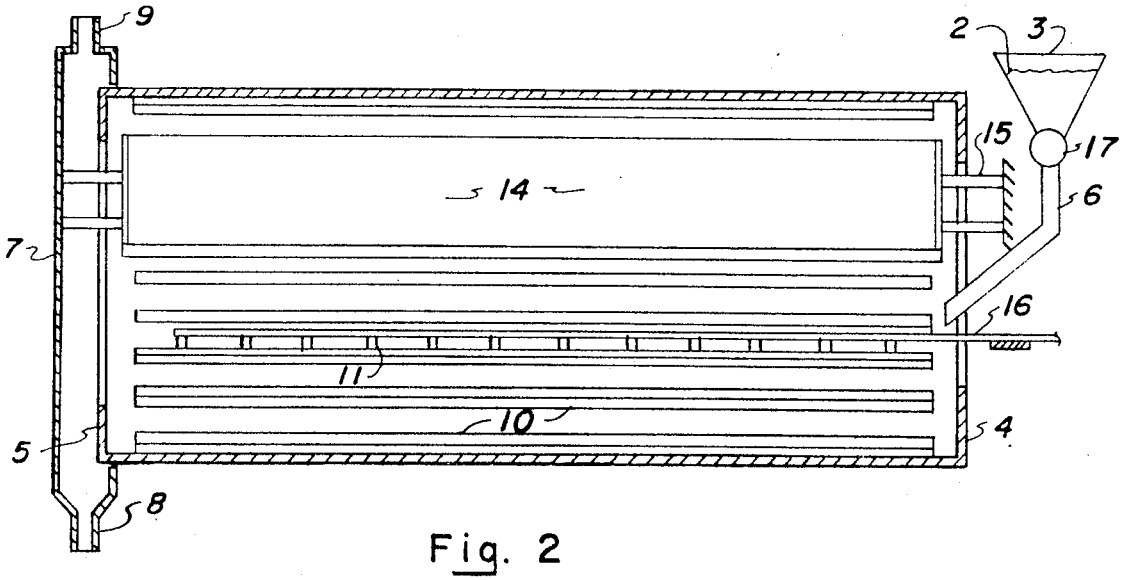

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 8

T927,005
METHOD AND APPARATUS FOR APPLYING COATINGS TO SOLID PARTICLES

Glenn M. Blouin, 1202 Sorrento Road, Florence, Ala. 35630

Filed July 24, 1973, Ser. No. 382,153
Int. Cl. B44d *1/02*
U.S. Cl. 117—100 A
1 Sheet Drawing. 25 Pages Specification

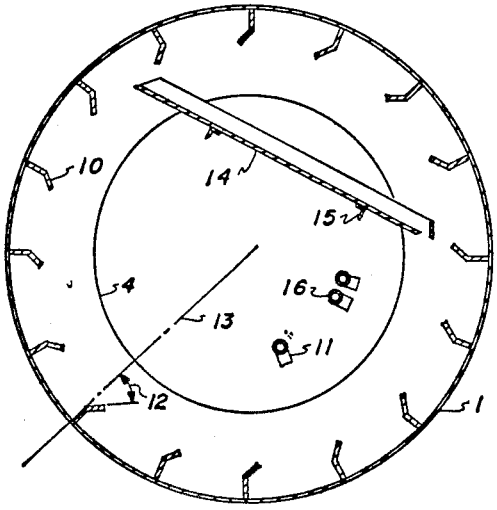

Apparatus and process for more effectively coating materials such as medicinal compounds, food products, and undersize fertilizer particles with the same, or different, fertilizer compounds for purposes of granulation as well as controlled release. Specific applications are directed to sulfur-coated urea. The primary object is to provide random motion of the particles with respect to each other, thereby producing a truly homogeneous moving mass of particles in a simple, conventional horizontal rotary drum to ensure that all particles are equally exposed to a liquor or molten spray material as they pass through the drum regardless of range of size or shape. This is accomplished by a unique modification of the existing prior art of flighted horizontal rotary drum coolers and driers by formation of an enlarged sprayable area of the homogeneous mass of moving particles therein, said area consisting in part of the surface of the natural rolling bed in the drum and in part of the face of a falling cascade of particles that extends the entire length of the drum, but in contrast to prior art, is concentrated to one side of the drum into a dense, homogeneous, narrow stream of particles that covers only a small portion (say 1 to 10 percent) of the cross sectional area of the drum. This continuous cascade is formed by positioning by means of fixed supports extended into the end openings of the drum a stationary longitudinal deflector pan above the rolling bed in the interior of the drum. The deflector pan extends the length of the drum and is sloped downward across its width toward the high edge of the rolling bed so that showers of particles being discharged by the lifting flights are caught by the deflector pan, the effective (horizontally projected) width of which may be 40 to 80 percent of the drum diameter, where they combine and slide off the lower edge of the pan to form the dense, homogeneous cascade that strikes the rolling bed near its high side and along its entire length.

Oct. 1, 1974 G. M. BLOUIN T927,005

METHOD AND APPARATUS FOR APPLYING COATINGS TO SOLID PARTICLES

Filed July 24, 1973